United States Patent

Umeda et al.

[11] Patent Number: 5,281,380
[45] Date of Patent: Jan. 25, 1994

[54] METHOD FOR MANUFACTURING FIBER REINFORCED ELASTIC SHEET, APPARATUS FOR MANUFACTURING THE SAME AND MOLD TO BE USED

[75] Inventors: Arao Umeda; Yoshitaka Tajima; Tsutomu Shioyama, all of Kobe, Japan

[73] Assignee: Bando Chemical Industries, Ltd., Kobe, Japan

[21] Appl. No.: 727,967

[22] Filed: Jul. 10, 1991

[30] Foreign Application Priority Data

Jul. 12, 1990 [JP] Japan ................ 2-18093
Jul. 12, 1990 [JP] Japan ............... 2-186092
Jul. 24, 1990 [JP] Japan ............... 2-195443
Jul. 25, 1990 [JP] Japan ............... 2-196900

[51] Int. Cl.$^5$ ............................. B32B 5/12
[52] U.S. Cl. .................. 264/108; 264/176.1; 264/209.8; 425/382.4; 425/461; 425/467
[58] Field of Search ............ 264/108, 176.1, 209.2, 264/209.8; 425/461, 382.4, 467

[56] References Cited

U.S. PATENT DOCUMENTS

| | | | |
|---|---|---|---|
| 3,296,346 | 1/1967 | Shannon | 264/108 |
| 3,697,364 | 10/1972 | Boustany et al. | 264/108 |
| 3,759,653 | 9/1973 | Schreiber | 425/382.4 |
| 3,836,412 | 9/1974 | Boustany et al. | 264/108 |
| 4,056,591 | 11/1977 | Goettler et al. | 264/108 |
| 4,057,610 | 11/1977 | Goettler et al. | |
| 4,203,732 | 5/1980 | Phaal | 264/108 |
| 4,240,782 | 12/1980 | McPhee et al. | 264/108 |
| 4,272,577 | 6/1981 | Lyng | 264/108 |
| 4,627,472 | 12/1986 | Goettler et al. | 264/108 |

FOREIGN PATENT DOCUMENTS

| | | | |
|---|---|---|---|
| 3801574 | 8/1989 | Fed. Rep. of Germany . | |
| 2494180 | 5/1982 | France | 264/108 |
| 2-16005 | 1/1990 | Japan | 264/108 |
| 2236504 | 4/1991 | United Kingdom | 264/108 |

Primary Examiner—Jeffery Thurlow
Attorney, Agent, or Firm—Sixbey, Friedman, Leedom & Ferguson

[57] ABSTRACT

A method for manufacturing a fiber reinforced elastic sheet by extruding and processing an elastomer containing staples by 25 volume % or less. The elastomer, which uniformly flows in a sheet width direction, passes through a slight clearance of a molding die in the vertical direction of the sheet, and then the elastomer flow is enlarged in the vertical direction of the sheet. A flow adjustment portion is provided in a passage of the elastomer to flow uniformly in the sheet width direction, and a weir portion is provided on the downstream side of the flow adjustment portion. A clearance Wo of an outlet in the vertical direction of the sheet, a clearance Wi formed by the weir portion in the vertical direction of the sheet and a distance l between the weir portion and the outlet have the relationship of $W_o/W_i \geqq 2$ $l \geqq 3 W_o$ $0.3 \text{ mm} \leqq W_i \leqq 5 \text{ mm}.$ 5 Claims, 7 Drawing Sheets

METHOD FOR MANUFACTURING FIBER REINFORCED ELASTIC SHEET, APPARATUS FOR MANUFACTURING THE SAME AND MOLD TO BE USED

BACKGROUND OF THE INVENTION

The present invention relates to a method for manufacturing a fiber reinforced elastic sheet, an apparatus for manufacturing the same and a mold to be used.

In general, there has been known a staple complex sheet to be used for a compression rubber layer of a transmission belt, a vibroisolating rubber, a cushioning material, a sealant, a shoe sole material, a floor material, a caterpillar cover material and the like if a base material is an elastomer, and to be used for a sliding member, a reinforcing parts and the like if the base material is a plastic.

Referring to the known manufacturing method, fiber orientation is random or is parallel with a sheet surface. The fiber orientation cannot fully be controlled so that uses are limited. In other words, most of the above-mentioned products exhibit the merits of staple complex, for example, compression resistance, abrasion resistance, slide and the like if the staples are mainly oriented in the perpendicular direction of a sheet surface (in a sheet thickness direction) or the like. However, it is difficult to orient the staples in the perpendicular direction to the sheet surface or the like.

Conventionally, there have been known methods for orienting the staples of the staple reinforced material.

(1) Calendaring method: The staples are mainly oriented uniaxially in a sheet length direction.

(2) extrusion molding method: The staples are mainly oriented uniaxially in the extrusion direction. In addition, Japanese Patent Publication No. 53-14239 has disclosed a method for orienting the staples out of the extrusion direction so as to obtain a ring extruded substance, while Japanese Patent Publication No. 58-29231 has disclosed a method for manufacturing a hose in which the radial component of the staple orientation exceeds the axial component thereof. However, the above-mentioned methods do not fully meet the requirement for high orientation. Furthermore, it is impossible to obtain a uniform sheet having a large width. More specifically, a fixed portion of an inside mold causes the turbulence of a material so that the orientation is partially disturbed.

(3) Injection molding method: The staples are mainly oriented in the flow direction of the material. It is difficult to wholly orient the staples in a constant direction.

(4) Laminating method: Japanese Unexamined Patent Publication No. 60-219034 has disclosed a method for laminating a lot of sheets, in which the staples are mainly oriented in the sheet length direction by calendering or extrusion, in the same direction and then cutting the sheets at a constant width so as to obtain a sheet in which the staples are mainly oriented in the direction of a minimum dimension (thickness). However, processing is troublesome. Accordingly, it is substantially difficult to obtain the sheet having a large area.

SUMMARY OF THE INVENTION

It is an object of the present invention to easily manufacture a fiber reinforced elastic sheet in which staples are oriented in the vertical direction of a sheet (in a sheet thickness direction).

The present invention provides a method for manufacturing a fiber reinforced elastic sheet formed of an elastomer containing staples by 25 volume % or less, comprising steps of making the elastomer, which uniformly flows in a sheet width direction, pass through a slight clearance in the vertical direction of the sheet, and enlarging the elastomer flow in the vertical direction of the sheet. Consequently, the slight clearance applies shearing force to the elastomer passing therethrough, so that the staples mixed in the elastomer are oriented in the vertical direction of the sheet.

The present invention provides a mold for a fiber reinforced elastic sheet formed of an elastomer containing staples by 25 volume % or less comprising a flow adjustment portion provided in a passage of the elastomer to flow uniformly in the sheet width direction, and a weir portion provided on the downstream side of the flow adjustment portion, wherein a clearance $W_o$ of an outlet in the vertical direction of the sheet, a clearance $W_i$ formed by the weir portion in the vertical direction and a distance $l$ between the weir portion and the outlet have the relationship of $$W_o/W_i \geqq 2$$

$$l \geqq 3W_o$$

$$0.3 \text{ mm} \leqq W_i \leqq 5 \text{ mm}.$$

Consequently, the elastomer, which uniformly flows in the sheet width direction through the flow adjustment portion, receives the shearing force when passing through the weir portion. Thus, the staples mixed in the elastomer are oriented in the flow direction. When the thin elastomer, which has staples oriented in the flow direction, passes through the weir portion, the elastomer flow is changed in the vertical direction of the sheet so that the staples mixed in the elastomer are oriented in the vertical direction of the sheet.

To easily manufacture a staple complex sheet, which has staples oriented mainly in the vertical direction of the sheet, in a single step, the present invention provides a method for manufacturing a fiber reinforced elastic sheet formed of a staple complex elastomer, wherein the staple complex elastomer includes a thermoplastic material and staples which have an aspect ratio of 10 or more and a length of 10 mm or less, and a factor b is 0.6 to 1.0 when a viscosity is $2.0 \times 10^4$ to $1.0 \times 10^7$ poise, a temperature is 70° to 140° C. and a shearing strain speed $d\gamma/dt$ is 1 to 200 sec$^{-1}$ in the following formula, $$\log \eta = a/T - b \log (d\gamma/dt) + c$$

$\eta$: viscosity (poise)
a, b, c: constant
T: absolute temperature (°K.)
$d\gamma/dt$: shearing strain speed (sec$^{-1}$)
the mold has the following dimensions, $$ho/hm \geqq 3$$

$$hm \leqq 2 \text{ mm}$$

$$lmo \geqq 3 \, hm$$

ho: dimension of the outlet of the mold in the vertical direction of the sheet
hm: dimension corresponding to ho in a minimum dimension portion in a molding passage of the mold lmo: length of the molding passage from the outlet to the minimum dimension portion of the mold and the orientation coefficients of the staples are as follows.

$$Hz > Hx \text{ and } Hz > Hy$$

$$Hx = \{(1/Vx)/(1/Vx + 1/Vy + 1/Vz)\} \times 100 \ (\%)$$

$$Hy = \{(1/Vy)/(1/Vx + 1/Vy + 1/Vz)\} \times 100 \ (\%)$$

$$Hz = \{(1/Vz)/(1/Vx + 1/Vy + 1/Vz)\} \times 100 \ (\%)$$

Hx: staple orientation coefficient in a sheet length direction
Hy: staple orientation coefficient in a sheet width direction
Hz: staple orientation coefficient in the perpendicular direction to a sheet surface (in a sheet thickness direction)
Vx: linear expansion coefficient in the sheet length direction in a solvent
Vy: linear expansion coefficient in the sheet width direction in the solvent
Vz: linear expansion coefficient in the perpendicular direction to the sheet surface (in the sheet thickness direction) in the solvent wherein the staple complex elastomer includes a thermoplastic material and staples which have an aspect ratio of 10 or more and a length of 10 mm or less, and a factor b is 0.6 to 1.0 when a viscosity is $2.0 \times 10^4$ to $1.0 \times 10^7$ poise, a temperature is 70° to 140° C. and a shearing strain speed $d\gamma/dt$ is 1 to 200 $sec^{-1}$, and the mold has the following dimensions, $$ho/hm \geq 3$$

$$hm \leq 2 \text{ mm}$$

$$lmo \leq 3 \text{ hm,}$$

and the staple orientation coefficients are as follows, $$Hz > Hx \text{ and } Hz > Hy.$$

Consequently, the staples are once oriented in the flow direction of the staple complex elastomer in the minimum dimension portion. In addition, the area of the molding passage is quickly increased, so that the staple orientation is changed in the vertical direction of the sheet.

The mold is a T-dice having a molding passage which is gradually enlarged in the sheet width direction, a ring dice having a ring molding passage and includes an outlet having at least one arcuate outlet portion.

The present invention provides a method for manufacturing a fiber reinforced elastic elastomer wherein a staple complex elastomer mixed with staples is circumferentially extended and extruded through a ring groove of an expansion die so as to circumferentially orient the staples, the expansion die having an inner peripheral surface, an outer peripheral surface and the ring groove which is provided between the inner and outer peripheral surfaces and is substantially filled with the staple complex elastomer, and the cylindrical staple complex elastomer extruded from the ring groove of the expansion die is unpressurized and is gradually extended circumferentially. The cylindrical staple complex elastomer extruded from the ring groove of the expansion die is unpressurized and is gradually extended circumferentially.

The present invention provides an apparatus for manufacturing a fiber reinforced elastic elastomer wherein a staple complex elastomer mixed with staples is circumferentially extended and extruded through a ring groove of an expansion die so as to circumferentially orient the staples, the expansion die having an inner peripheral surface, an outer peripheral surface and the ring groove which is provided between the inner and outer peripheral surfaces and is substantially filled with the staple complex elastomer, an enlargement adaptor is connected to the outlet side of the expansion die, the enlargement adaptor includes an outer peripheral surface which has almost the same diameter as the inner diameter of the ring groove and is coaxial with the ring groove, and the outer peripheral surface of the enlargement adaptor has a diameter which is increased with a suitable slope. Accordingly, the staples of the staple complex elastomer are circumferentially oriented while being extruded through the ring groove of the expansion die, and are circumferentially extended by the outer peripheral surface of the enlargement adaptor at the outlet until the elastomer is unpressurized in the die. Consequently, no shrinkage is caused so that the circumferential orientation coefficient can be increased.

The present invention provides a fiber reinforced elastic sheet containing staples by 40 volume % or less in a base elastomer or thermoplastic resin, wherein there are obtained by the following formulas the staple orientation coefficients of $Hx > 50$ (%) on a surface layer and $Hz > 50$ (%) on an inner center layer, and the mean orientation coefficient on a middle layer between the surface layer and the inner center layer.

$$Hx = \{(1/Vx)/(1/Vx + 1/Vy + 1/Vz)\} \times 100 \ (\%)$$

$$Hz = \{(1/Vz)/(1/Vx + 1/Vy + 1/Vz)\} \times 100 \ (\%)$$

Hx: staple orientation coefficient in a sheet length direction
Hz: staple orientation coefficient in the perpendicular direction to a sheet surface (in a sheet thickness direction)
Vx: linear expansion coefficient in the sheet length direction in a solvent
Vy: linear expansion coefficient in a sheet width direction in the solvent
Vz: linear expansion coefficient in the perpendicular direction to the sheet surface (in the sheet thickness direction) in the solvent Accordingly, the staples are oriented with an orientation coefficient of $Hx > 50$ (%) in the sheet length direction on the sheet surface layer, and are oriented with an orientation coefficient of $Hz > 50$ (%) on the inner center layer. Consequently, a deformation resistance is made greater in the sheet length direction on the surface layer than on the inner center layer, so that the peculiar mechanical behavior is presented. In addition, the staple complex sheet has the mean orientation coefficient on the middle layer between the surface layer and the inner center layer, so that the staple orientation is changed successively and naturally. Consequently, a stress concentration portion is not generated. Furthermore, it is also possible to obtain a staple complex sheet, which has staples highly oriented in the vertical direction of the sheet, by removing the surface layer.

These and other objects, features and advantages of the present invention will become more apparent upon a reading of the following detailed description and drawings.

DETAILED DESCRIPTION OF PREFERRED EMBODIMENTS

Preferred embodiments of the present invention will be described in more detail with reference to the drawings.

Embodiment 1

Figure 1:
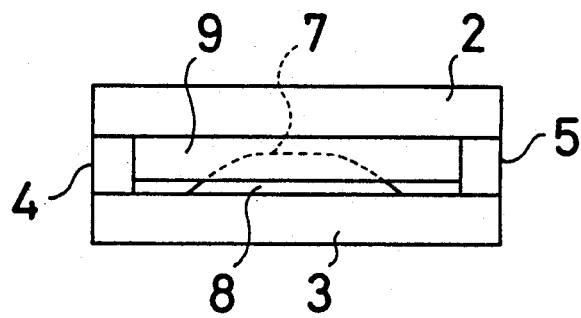
FIG. 1 is an elevation view of a molding die.
Figure 2:
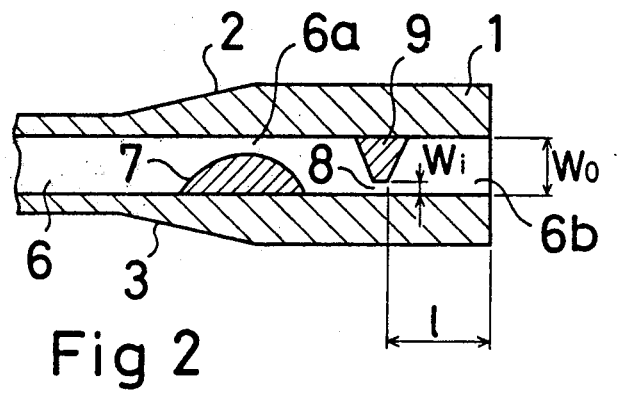
FIG. 2 is a longitudinal section view of the molding die.
Figure 3:
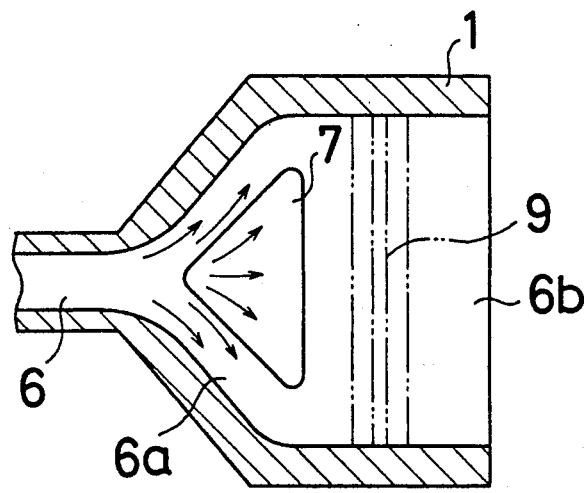
FIG. 3 is a lateral section view of the molding die.
Figure 4:
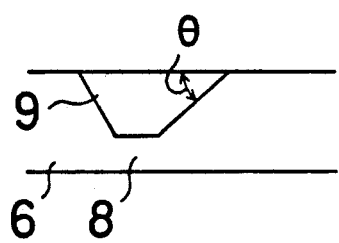
FIG. 4 is a view for explaining the slanting angle of a weir portion.

FIGS. 1 to 3 show a molding die of a fiber reinforced elastic sheet. In FIGS. 1 to 3, indicated at 1 is a T-molding dice to be attached to the tip of a well-known extruder. The T-molding die 1 includes an upper member 2, a lower member 3, and right and left lateral members 4 and 5 which form a rubber passage 6. The rubber passage 6 is approximately rectangular in cross section and has an enlarged slanting portion 6a and an opening 6b. The enlarged slanting portion 6a has a sectional area which is enlarged gradually and horizontally. The opening 6b is continuously provided on the downstream side of the enlarged slanting portion 6a and has the maximum sectional area.

A well-known rubber flow adjustment portion 7 is provided on the lower member 3. The rubber flow adjustment portion 7 is projected upward in a portion corresponding to the enlarged slanting portion 6a of the rubber passage 6 and uniformly enlarges the rubber flow right and left.

A weir portion 9 is projected downward on the upper member 2 corresponding to the opening 6b of the rubber passage 6 on the downstream side of the rubber flow adjustment portion 7 in order to form a long rectangular and uniform clearance 8 horizontally relative to the lower member 3.

It is necessary to set to 2 or more the ratio of a vertical length Wi of the clearance 8 formed by the weir portion 9 to a vertical length Wo of the clearance of the opening 6b of the rubber passage 6, i.e., $$Wo/Wi \geqq 2$$

In addition, it is necessary to set the length Wi to 0.3 to 5 mm, i.e., $$0.3 \text{ mm} \leqq Wi \leqq 5 \text{ mm}$$

preferably 0.5 to 1 mm. If the length Wi is smaller than 0.3 mm, an extrusion pressure is excessively increased and rubber clogging is caused. If the length Wi is greater than 5 mm, there is decreased the orientation of staples in the vertical direction (of a sheet). Accordingly, the length Wi is set to 0.3 to 5 mm.

It is necessary to set a distance l between the weir portion 9 and the opening end of the opening 6b to three times as much as the length Wo or more, i.e., $$l \geqq 3 \, Wo$$

preferably five to ten times as much as the length Wo. If the distance l is three times as much as the length Wo or more, it is possible to obtain the sheet having a stable thickness. If the distance l exceeds ten times as much as the length Wo, more staples are oriented in a sheet flow direction.

The shape of the weir portion 9 is not particularly limited. An upstream side 8a is slanted so as to reduce a pressure loss. It is preferable that a downstream side 8b has a slanting angle $\theta$ of 20° to 25° in order to orient the staples most effectively in the vertical direction (of the sheet).

Figure 5:
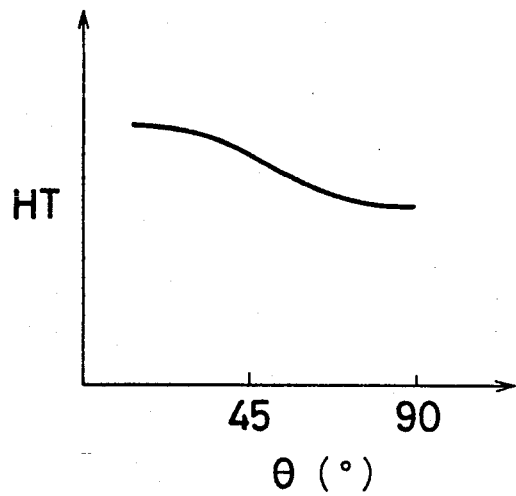
FIG. 5 is a diagram showing the relationship between the slanting angle of the weir portion and an orientation coefficient in the vertical direction of a sheet.

Referring to the evaluation by a toluene swelling method as shown in FIG. 5, a vertical orientation coefficient Ht of the staples is peak when the slanting angle $\theta$ is 25° or less.

With the above-mentioned structure, the rubber flow is expanded uniformly and horizontally from the enlarged slanting portion 6a of the rubber passage 6 to the opening 6b through the rubber flow adjustment portion 7. When passing through the weir portion 9, shearing force is applied to the rubber flow which is expanded uniformly and horizontally. Consequently, the staples mixed in a rubber material are oriented in the rubber flow direction.

When the thin rubber material, in which the staples are oriented in the rubber flow direction, completely passes through the weir portion 9, the sectional area and vertical length of the rubber passage 6 are increased. Consequently, the rubber flow is changed in the vertical direction of the sheet (in a sheet thickness direction), so that the staples mixed in the rubber are correspondingly oriented in the vertical direction of the sheet (in the sheet thickness direction).

In that case, when the distance l between the weir portion 9 and the opening end of the opening 6b is set to 3 Wo or more, the frictional force between the rubber material and the wall of the rubber passage 6 applies a back pressure which makes the rubber flow be changed in the vertical direction of the sheet through the weir portion 9.

Examples of an elastomer forming the rubber material are a crosslinking elastomer such as natural rubber, styrene-butadien rubber, chloroprene rubber, acrylonitrile-butadiene rubber, ethylene propylene rubber, or urethane rubber, a thermoplastic elastomer such as polyolefine, polyester, polyether, polyamide or polyurethane, and the like. Examples of general elastomer extender and additive are a reinforcing agent, a filler, a softening agent, a crosslinking agent, a crosslinking accelerator, a crosslinking accelerating assistant, an age resistor, a tackifier, an antistatic agent, a mixing adhesive and the like.

If a mixing amount of the staples exceeds 25 volume %, it is difficult to perform extrusion molding. Accordingly, it is necessary to set the mixing amount of the staples to 25 volume % or less, Examples of the staple are a synthetic fiber such as aliphatic polyamide, aromatic polyamide, polyester, acryl or acetyl polyvinyl alcohol, a natural fiber such as cotton, silk, wool or pulp, a semisynthetic fiber such as rayon, a metallic fiber such as steel, stainless or copper, and the like. If _cessary, the surface of the staple is bonded by epoxy, isocyanate, resothin formalin latex (RFL), a chlorinated rubber adhesive or the like.

The shape of the staple is not particularly limited. If the ratio (L/D) of a length to a diameter is too great, it is difficult to disperse the staples into the rubber material. If L/D is too small, there is reduced an effect for anisotropic application of an elastic coefficient.

Consequently, it is desired that L/D is 10 to 1000 and the length is 50 mm or less.

There will be described an example.

The well-known rubber materials are kneaded by an internal kneader and then are mixed with a nylon 66 fiber having a length of 3 mm by 15 volume %. The mixture is rolled to be ribbon-shaped.

The molding dice to be used has Wi of 0.5 mm, Wo of 5 mm and l of 40 mm. The rubber flow adjustment portion is provided on the upstream side of the weir portion. The molding dice is attached to an extruder head and is heated to a predetermined temperature along with an extruder in order to supply the mixture and mold a sheet.

The sheet thus obtained is press vulcanized. Then, the vulcanized substance is immersed in a solvent (toluene). When balance swelling is reached, a linear expansion coefficient of each of three dimensional axes is measured. The staple orientation in the vertical direction of the sheet is 67.3% by the following formula.

$$Hi = \{(1/Vi)/(1/V1 + 1/V2 + 1/V3)\} \times 100\ (\%)$$

i = 1, 2, 3
V1, V2, V3: solvent linear expansion coefficient of each three dimensional axes The upper and lower surface layers of the vulcanized sheet are removed by a buff by 0.5 mm. Then, the vertical orientation of the sheet is measured in similar to the foregoing. As a result, the orientation coefficient of 80.5% is obtained. Accordingly, the staple orientation of the upper and lower surface layers of the sheet is gradually increased in the rubber flow direction. When the upper and lower surface layers are removed, it is found that the internal layers of the sheet have staples oriented in the vertical direction of the sheet with a high orientation coefficient.

In the case where the sheet thus manufactured is utilized as a vibroisolating material, the surface layers may be held if necessary.

The internal layers of the sheet have different elastic characteristics in the vertical direction and other directions as described above. Consequently, it is possible to manufacture the vibroisolating material having different damping characteristics in compression and shearing directions without a shape factor.

The staples are uniformly projected onto the surfaces which are obtained by removing the upper and lower surface layers by means of the buff. Consequently, a friction coefficient can be controlled according to the mixing amount of the staples and abrasion resistance can greatly be enhanced. Thus, the surfaces can be used for a sliding member, in particular, a mechanism for applying frictional force, such as a brake, a clutch, a torque limiter or a mechanism for adjusting lever operating force.

The sheet is wound onto a shaft member as a core so as to form a roll and then vulcanize the same. Thereafter, the outer peripheral surface of the roll is uniformly processed by the buff. Consequently, it is possible to manufacture the roll which has the staples oriented radially and has high compressive elasticity. In addition, the friction coefficient of the roll surface can be reduced. Consequently, when the roll is driven by a belt, the deviation of the belt can be reduced. Furthermore, it is also possible to manufacture the roll of which abrasion resistance is greatly enhanced.

Accordingly, the sheet, in which most of the mixed staples are oriented in the vertical direction of the sheet, can be manufactured only by making the elastomer having the staples pass through the molding dice. Consequently, a manufacturing process can be simplified, so that mass production can be attained. Similarly, units of working time can greatly be reduced, so that the sheet can cheaply be manufactured and can continuously be produced by the molding dice. Thus, it is possible to obtain a product having stable quality and high reliability.

EMBODIMENT 2

Figure 6:
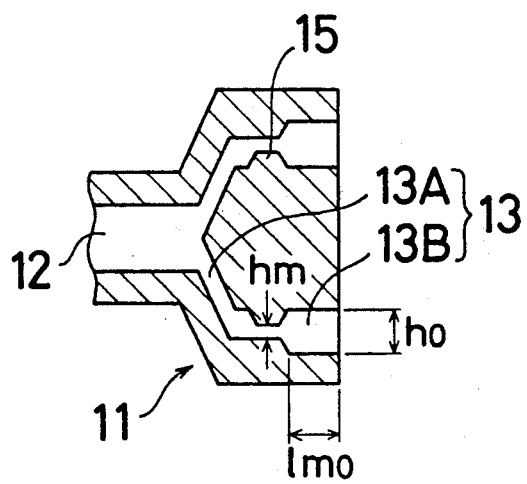
FIG. 6 is a section view of a mold.
Figure 7:
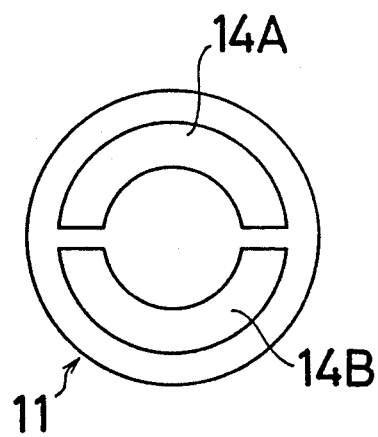
FIG. 7 is an elevation view of the mold.

As shown in FIGS. 6 and 7, a mold 11 to be used for manufacturing a staple complex sheet according to the present invention has a main molding passage 12, a ring molding passage 13 and semiarcuate outlets 14A and 14B. The ring molding passage 13 has a first passage 13A and a second passage 13B. The first passage 13A communicates with the main molding passage 12 and has a diameter which is gradually increased. The second passage 13B has a diameter which is almost equal to the maximum diameter of the first passage 13A. A minimum dimension portion 15 (dam) is provided in the middle of the second passage 13B. The minimum dimension portion 15 is used for reducing the sectional area of the passage. In FIG. 6, indicated at ho is the dimension of the outlets 14A and 14B in the vertical direction of the sheet, indicated at hm is the dimension of the minimum dimension portion 15 in the vertical direction of the sheet (the minimum dimension of the second passage 13B), and indicated at l mo is the length of the passage from the minimum dimension portion 15 to the outlets 14A and 14B.

The staple complex sheet according to the present invention comprises a thermoplastic material and staples which have an aspect ratio of 10 or more and a length of 10 mm or less. The viscosity of the material is $2.0 \times 10^4$ to $1.0 \times 10^7$ poise when passing through the molding passage. In the following formula, a factor b is 0.6 to 1.0 in a region having a viscosity of $2.0 \times 10^4$ to $1.0 \times 10^7$ poise and $d\gamma/dt$ of 1 to 200 sec$^{-1}$.

$$\log \eta = a/T - b \log (d\gamma/dt) + C$$

$\eta$: viscosity (poise)
a, b, c: constant
T: absolute temperature (° K.)
$d\gamma/dt$: shearing strain speed (sec$^{-1}$)

Examples of the thermoplastic material are (1) a compound obtained by adding an extender to a crosslinking elastomer such as natural rubber, stylene-butadiene rubber, chloroprene rubber, acrylonitrile-butadiene rubber or ethylene propylene rubber, (2) a thermoplastic elastomer such as olefine, ester, ether, amide or urethane, and a compound obtained by adding the extender to the thermoplastic elastomer, (3) a thermoplastic resin such as polyethylene, polyvinyl chloride, polypropylene, nylon or polyester, and a compound obtained by adding the extender to the thermoplastic resin, and the like.

Examples of the staple are (1) a natural fiber such as cotton, silk or wool, a synthetic fiber such as nylon, aramide, polyester, acryl or vinylon, an inorganic fiber such as glass, carbon, silica, silicon nitride or alumina, a metallic fiber and the like. If the aspect ratio is smaller than 10, it is impossible to obtain much anisotropic effects such as reinforcement by staple complex. Consequently, there can seldom be obtained effects by fiber orientation. there can seldom be obtained effects by fiber orientation. If the fiber length is greater than 10 mm, it is difficult to obtain by the following mold a sheet having staple orientation coefficients of $Hz > Hx$ and $Hz > Hy$. Indicated at Hx is a staple orientation coefficient in the sheet length direction. Indicated at Hy is the staple orientation coefficient in the sheet width direction. Indicated at Hz is the staple orientation coefficient in the perpendicular direction to a sheet surface (in the sheet thickness direction). The staple orientation coefficients Hx, Hy and Hz are defined by the following formulas.

$$Hx = \{(1/Vx)/(1/Vx + 1/Vy + 1/Vz)\} \times 100 \ (\%)$$

$$Hy = \{(1/Vy)/(1/Vx + 1/Vy + 1/Vz)\} \times 100 \ (\%)$$

$$Hz = \{(1/Vz)/(1/Vx + 1/Vy + 1/Vz)\} \times 100 \ (\%)$$

Hx: staple orientation coefficient in the sheet length direction
Hy: staple orientation coefficient in the sheet width direction
Hz: staple orientation coefficient in the perpendicular direction to the sheet surface (in the sheet thickness direction)
Vx: linear expansion coefficient in the sheet length direction in a solvent
Vy: linear expansion coefficient in the sheet width direction in the solvent
Vz: linear expansion coefficient in the perpendicular direction to the sheet surface (in the sheet thickness direction) in the solvent In respect of fluidity, the viscosity $\eta$ of the above-mentioned compound is measured by varying the temperature T and the shearing strain speed $d\gamma/dt$ by means of a capillary rheometer and is numerically expressed by the above-mentioned formulas.

(1) When passing through the mold, the viscosity of the material is $2.0 \times 10^4$ to $1.0 \times 10^7$ poise. If the viscosity is smaller than $2.0 \times 10^4$ poise, the pressure of the material is made insufficient after passing through the minimum dimension portion 5 (having the minimum dimension of hm) in the molding passage so that it is difficult to obtain necessary staple orientation. If the viscosity exceeds $1.0 \times 10^7$ poise, it is difficult to obtain the desired shape of the sheet.

(2) In the case where the factor b is smaller than 0.6 in a region having a shearing strain speed of 1 to 200 when passing through the mold, the shearing strain speed is reduced and the apparent viscosity is not greatly increased when the passage is enlarged from a portion having a dimension of hm to a portion having a dimension of ho. Consequently, it is difficult to obtain a fine sheet. In the case where the factor b exceeds 1.0, the apparent viscosity is greatly increased when the shearing strain speed is reduced. Consequently, the flow of the material is disturbed. Thus, it is difficult to obtain a sheet having the uniform staple orientation.

Only in the case where the mold having a molding passage, which has the relationship of $ho/hm \geq 3$, $hm \leq 2$ (mm), and $lmo \geq 3hm$, is to be used, it is possible to obtain the uniform sheet having the relationship of $Hz > Hx$ and $Hz > Hy$. When ho/hm is smaller than 3 and hm is greater than 2 (mm), the staples are not oriented in the perpendicular direction to the sheet surface. In order to obtain the staple orientation as intended, it is necessary to orient the staples in parallel with the molding passage in a portion having the dimension of hm and then to orient the staples in the perpendicular direction to the sheet surface as the sectional area of the molding passage is increased from the portion having the dimension of hm to the portion having the dimension of ho. Consequently, it is required that ho/hm is equal to or greater than 3 and hm is equal to or smaller than 2 (mm). When lmo is smaller than 3 hm, the pressure is not sufficiently applied to the material which has passed through the portion having the dimension of ho. Consequently, it is impossible to obtain a sufficiently fine sheet.

The outlet opening of the mold may have any shape which meets the conditions of the molding passage. Even if the mold has a shape such as a T-die or ring dice, the intended sheet can be obtained. In order to obtain the uniform sheet having the intended orientation, it is desired that the mold has one or more arcuate outlet portion(s). Referring to the T-die, it is necessary to design a mold having high precision and to set conditions so as to control the fiber orientation and the flow speed in center and end portions. Referring to the ring die, it is necessary to fix an inner die in the molding passage. A fixed portion blocks a part of the passage. Consequently, the staple orientation in the vertical direction of the sheet in a material confluent portion (where the flow joins again), which is provided behind the fixed portion, is not the same as in other portions. If the mold has the arcuate openings, the uniform sheet can easily be obtained.

EXPERIMENT 1

The mold 11 having the arcuate openings 14A and 14B shown in FIGS. 6 and 7 is attached to the tip of the extruder, so that there can be obtained the extruded sheet comprising the following materials.

| | |
|---|---|
| chloroprene rubber | 100 part by weight |
| stearic acid | 2 |
| softening agent | variable |
| age resistor | 2 |
| magnesium oxide | 4 |
| zinc oxide | 5 |

-continued

| | |
|---|---|
| carbon black | variable |
| polyester fiber | variety, variable |

The mold 11 has hm of 0.5 mm, ho of 5 mm, and lmo of 40 mm. The polyester fiber has a filament diameter of 24 μm. A factor b in the above-mentioned viscosity formula is measured by a capillary rheometer in a region having a temperature of 70° to 140° C. and a shearing strain speed dγ/dt of 1 to 200, so that a factor b is obtained. The staple orientation coefficients Hx, Hy and Hz are found according to linear expansion coefficients. The linear expansion coefficients are obtained by vulcanizing the extruded sheet for 15 minutes at 160° C., cutting the resultant substance to have a constant dimension and immersing the same in toluene for 48 hours. The results are shown in Table 1.

EXPERIMENT 2

Figure 8:
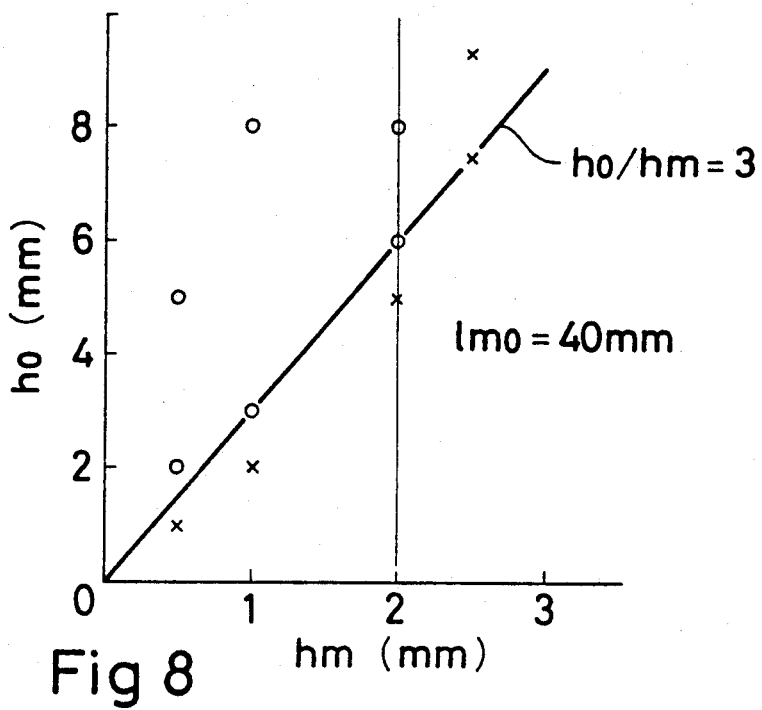
FIGS. 8 and 9 are diagrams showing the results of tests, respectively.
Figure 9:
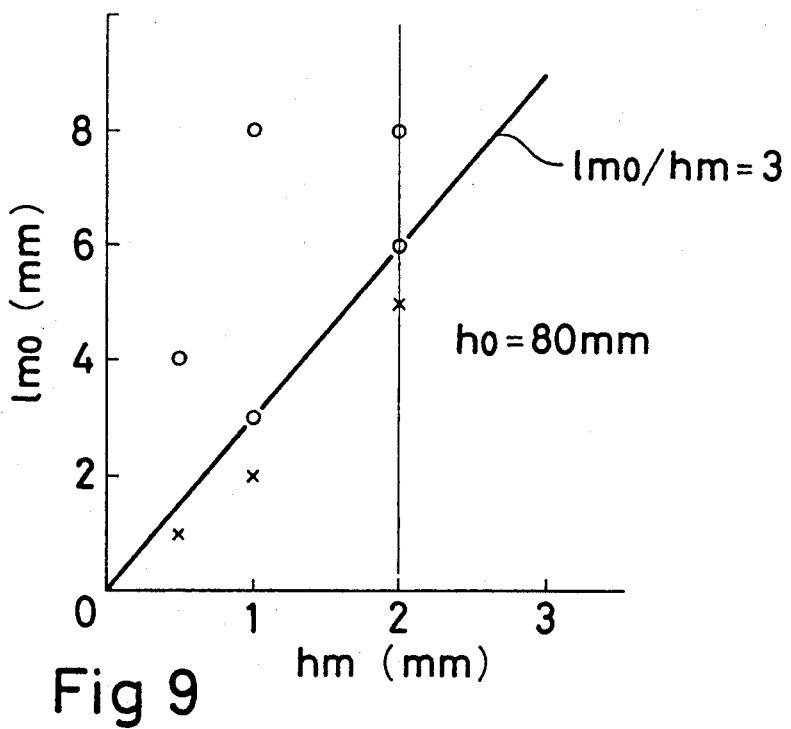

In Experiment 2, materials are the same as in Experiment 1. Extrusion molding is carried out by means of a mold in which hm, ho and lmo are changed but the structure is the same as in Experiment 1. Orientation coefficients Hx, Hy and Hz are shown in FIGS. 8 and 9.

EXPERIMENT 3

Figure 10:
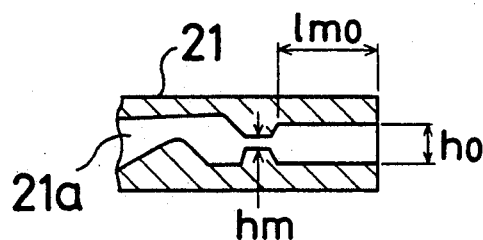
FIG. 10 is a section view of a T-die.
Figure 11:
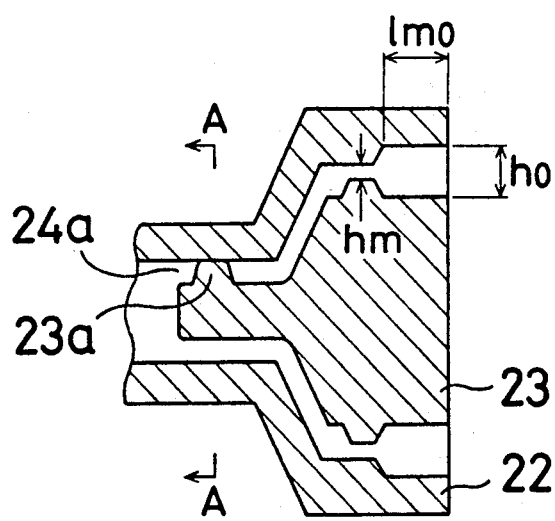
FIG. 11 is a section view of a ring die.
Figure 12:
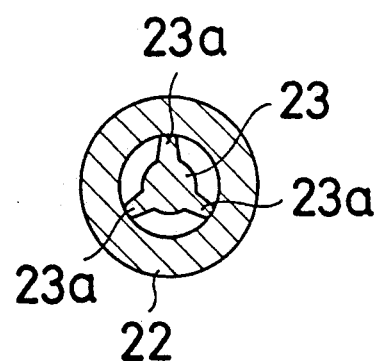
FIG. 12 is a view taken along the line A—A of FIG. 11.

Extrusion molding is carried out by means of a T-die 21 having a molding passage 21a shown in FIG. 10 and a ring die 24 having an outer die 22, an inner die 23 and a molding passage 24a shown in FIGS. 11 and 12. In FIG. 12, the inner die 23 is fixed by three supporting members 23a. Measurement is separately carried out in a confluent portion of the material which has passed through the supporting members 23a and a normal portion having no supporting members 23a.

The results are shown in Table 2.

TABLE 2

| | T-die | Ring die normal portion | Ring die confluent portion |
|---|---|---|---|
| Amount of softening agent | 5 | 5 | 5 |
| Amount of carbon | 40 | 40 | 40 |
| Fiber length (mm) | 3 | 3 | 3 |
| Amount of fiber | 20 | 20 | 20 |
| hm | 0.5 | 0.5 | 0.5 |
| ho | 6 | 6 | 6 |
| mo | 40 | 40 | 40 |
| Temperature of extruded rubber (°C.) | 95 | 95 | 95 |
| Factor b | 0.82 | 0.82 | 0.82 |
| Viscosity (poise) | $6 \times 10^5$ | $6 \times 10^5$ | $6 \times 10^5$ |
| Hx | 11 | 5 | 21 |
| Hy | 9 | 19 | 36 |
| Hz | 80 | 76 | 43 |
| Fineness of sheet | ○ | ○ | ○ |

EXPERIMENT 3

Figure 13:
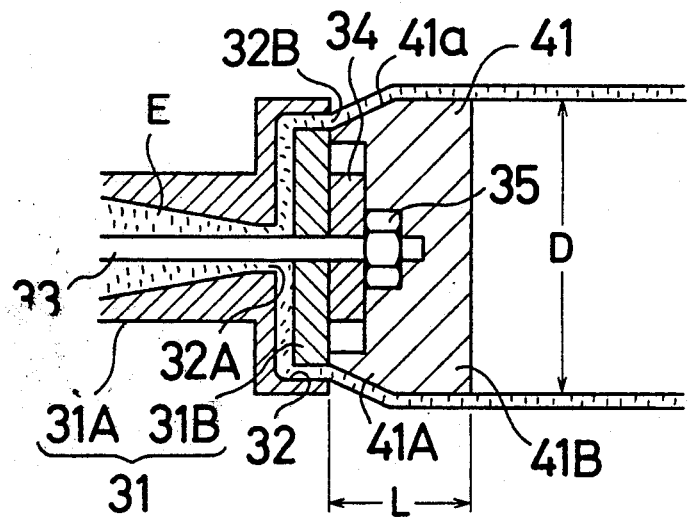
FIG. 13 is a section view of a main portion of an apparatus for manufacturing a staple complex elastomer according to embodiments of the present invention.

In FIG. 13, indicated at 41 is an enlargement adaptor which is connected to an expansion die 31. The enlargement adaptor 41 is formed such that a cylindrical staple complex elastomer E extruded from the expansion die 31 flows along an outer peripheral surface 41a. The cylindrical staple complex elastomer E is further extended circumferentially by the enlargement adaptor 41. The outer peripheral surface 41a of the enlargement adaptor 41 has a diameter increased with a suitable slope coaxially with a ring groove 32 of the expansion die 31. The staple complex elastomer E is circumferentially extended by the enlargement adaptor 41, so that the circumferential staple orientation coefficient of the staple complex elastomer E is further increased as compared with the case where only the expansion die 31 is utilized.

The outer peripheral surface 41a of the enlargement adaptor 41 has almost the same diameter as the inner diameter of the outlet of the ring groove 32 of the expansion die 31, and is coaxial with the ring groove 32 of the expansion die 31. The enlargement adaptor 41 has a taper portion 41A and a constant diameter portion 41B. The taper portion 41A is linearly slanted in the direction in which the diameter is gradually increased. The constant diameter portion 41B has the same diameter as the maximum outer diameter of the taper portion 41A and is continuously provided on the taper portion 41A.

The enlargement adaptor 41 may have any structure in which the staple complex elastomer E is gradually extended circumferentially. In FIG. 13, when a maximum diameter D and an axial length L of the enlargement adaptor 41 are increased, the cylindrical staple complex elastomer E may circumferentially be shrunk so as not to be extruded. Accordingly, it is necessary to determine the maximum diameter D and axial length L of the enlargement adaptor 41 depending on the rubber compound of the staples, the temperature at the time of extrusion, viscosity, the thickness of the cylindrical staple complex elastomer E, extruding speed and the like.

With the above-mentioned structure, the staple orientation is carried out in the following two steps so that the staple complex elastomer is molded.

(1) First step

The fiber orientation coefficient in the circumferential direction (in the direction of Y) is set to 80 to 85% by the expansion die 31.

The cylindrical staple complex elastomer E exits from the extruder and is shaped to have a cross section corresponding to the outlet of the extruder. Then, the cylindrical staple complex elastomer E enters the ring groove 32 of the expansion die 31 through an inlet 32A (sectional area: mi) of the expansion die 31, and thereafter flows circumferentially toward an outlet 32B (sectional area: mo). Accordingly, the staples of the staple complex elastomer E are gradually extended circumferentially according to the relationship of mo>mi even if they are oriented in any direction at the inlet 32A.

However, the orientation is disturbed owing to the flow resistance of the expansion die 31, or the elastomer does not flow uniformly in the passage. Consequently, the staples are not completely oriented circumferentially. The cylindrical staple complex elastomer E is circumferentially shrunk by about 2 to 2.5% on the basis of (the diameter of the inner die 31B of the expansion die 31+sheet thickness)×2π. Consequently, the circumferential orientation of the staples is disturbed. Immediately after a cylinder is extruded from the outlet, the die is swelled owing to the residual stress which is caused by the internal pressure and temperature during extrusion. Thus, the cylinder tends to be circumferentially shrunk so that the orientation is disturbed. As a result, Ro/Ri reaches the limit of 7.0. If Ro/Ri is smaller than 7.0, there appear orientation components other than the circumferential direction.

If Ro/Ri=7.0, the orientation coefficients are as follows.

X direction: 10 to 15%
Y direction: 80 to 85%
Z direction: 5 to 10%

(2) The orientation coefficient increased by the enlargement adaptor 41.

The cylindrical staple complex elastomer E, which is extruded with the staples oriented circumferentially, is further extended circumferentially (in the direction of Y) by the enlargement adaptor 41 so as to improve the circumferential orientation. The orientation coefficient is changed depending on an extension coefficient as shown in Table 3.

TABLE 3

| Extension coefficient | Orientation coefficient | | |
|---|---|---|---|
| | X direction | Y direction | Z direction |
| 0% | 10 to 15% | 80 to 85% | 5 to 10% |
| 1.0 | 9 to 12 | 83 to 87 | 4 to 5 |
| 2.5 | 2 to 3 | 90 to 92 | 2 to 3 |
| 5.0 | 1 to 2 | 93 to 99 | 1 to 2 |

The staple complex elastomer E is gradually enlarged by the enlargement adaptor 41. Consequently, the circumferential shrinkage is successively removed. In the case where the staple complex elastomer E is extruded at an extension coefficient of, for example, 2.5%, it is circumferentially shrunk when existing from the expansion die 31. As a result, there can be formed the cylindrical staple complex elastomer E having no shrinkage.

Thus, the circumferential staple orientation coefficient can be improved by combining the expansion die 31 and the enlargement adaptor 41. Consequently, there can be obtained the same effect as in a well-known calendering method. By way of example, the staple complex elastomer E can fully function as the bottom rubber of a transmission belt.

There will be described tests for the ratio of the axial length L to the maximum diameter D of the enlargement adaptor 41.

| <<Staple complex rubber compound used for extrusion>> | |
|---|---|
| chloroprene rubber | 100 part by weight |
| FEF carbon | 40 |
| S. A. | 1 |
| MgO | 5 |
| ZnO | 5 |
| age resistor | 3 |
| nylon staple (3 mm) | 10 |
| cellulose fiber | 10 |
| Total | 174 part by weight |
| <<Extruder used for tests>> | |
| L/D = 12, D = 90 mm | |
| <<Enlargement adaptor>> | |
| Expansion die: | |
| the outer diameter of an inner die is 200 mm. | |

The thickness of the extruded rubber sheet is 3.0 to 5.5 mm.

| <<Extension coefficient, L/D of the enlargement adaptor and extruding behavior of the staple complex rubber>> | | | |
|---|---|---|---|
| Extension coefficient | L/D | Sheet thickness | Extruding behavior |
| 0% | 70/200 | 3.0 mm | L ≧ 70, failure |
| 1.25 | 55/202.5 | 3.0 | L ≧ 60, failure |
| | | 5.5 | L ≧ 65, failure |
| 2.5 | 50/205 | 3.0 | L ≧ 50, failure |
| | | 5.5 | L ≧ 55, failure |
| 5.0 | 50/210 | 3.0 | L ≧ 45, failure |
| | | 5.5 | L ≧ 50, failure |
| | 40/215 | — | failure |

EMBODIMENT 4

Figure 14:
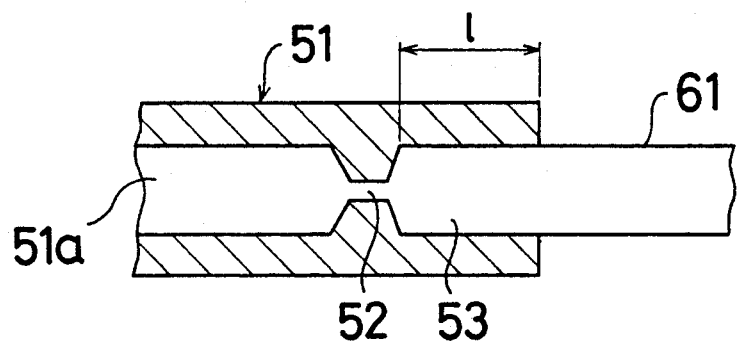
FIG. 14 is a section view of the mold.

FIG. 14 shows a mold to be used for manufacturing a staple complex sheet according to the present invention. In FIG. 14, a mold is indicated at 51. The mold 51 has a molding passage 51a. A dam portion 52 for reducing the area of the molding passage 51a is formed in the middle of the molding passage 51a. The dam portion 52 communicates with a space portion 53 of which passage area is greater than that of the dam portion 52. The passage length of the space portion 53 is set to l.

If the thermoplastic material mixed with the staples is supplied to the molding passage 51a of the mold 51, the staples are first oriented in the flow direction when passing through the dam portion 52 of the mold 51. Then, the thermoplastic material flows from the dam portion 52 into the space portion 53 having the greater passage area than the dam portion 52. At this time, the passage area is quickly increased so that the staple orientation is changed. Consequently, there can be manufactured a sheet 61 in which the staples are uniformly oriented in the vertical direction of the sheet. If the length l of the space portion 53 is increased, the staple orientation greatly tends to be changed in the flow direction (in the sheet length direction) in the vicinity of the material surface which comes into contact with the wall of the molding passage 51a. Consequently, the anisotropic difference between a sheet surface layer and an inner center layer is increased. The sheet thus obtained is cooled and solidified, or heated and crosslinked, so that the desired sheet can be prepared.

Figure 15:
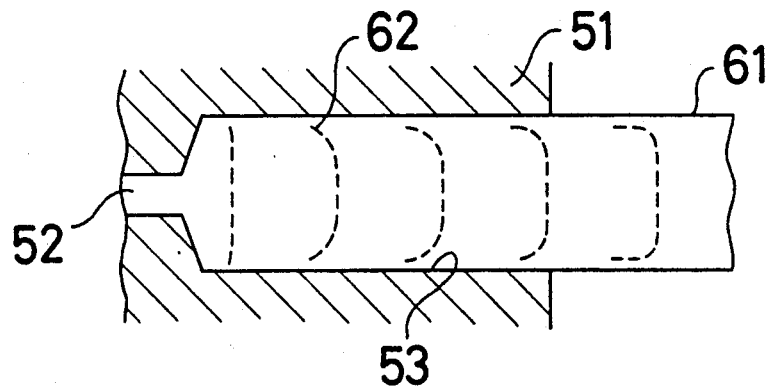
FIG. 15 is an enlarged view of a main portion of the mold.

It is supposed that shearing strain is caused in the flow direction on the sheet surface layer owing to the friction between the material surface and the wall of the molding passage 51a in the space portion 53, and staples 62 are oriented in the sheet length direction when approaching to the sheet surface (see FIG. 15).

Examples of the thermoplastic material are a thermoplastic resin such as polyvinyl chloride or polyethylene, a thermoplastic elastomer such as olefine, ester, ether, amide or urethane, crosslinking rubber such as natural rubber, stylene-butadien rubber or chloroprene rubber, and their compounds.

Examples of the staple are a natural fiber such as cotton, wool or pulp, a synthetic fiber such as polyester, nylon or aramide, a semisynthetic fiber such as rayon, an inorganic fiber such as ceramic, and a metallic fiber. If fiber capacity exceeds 40 volume %, the friction coefficient between the staples and molding passage wall is decreased and fluidity is lowered. Consequently, the staple orientation is blocked in the length direction of the sheet surface layer so that the orientation is lowered. It is desired that the staple length is half of the sheet thickness or less.

There will be described an experiment on the staple complex sheet.

By using a mold in which the dam portion 52 has a gap of 0.5 mm and the space portion 53 has a gap of 6 mm, the following materials are extruded and molded, and then are vulcanized to prepare a vulcanized sheet.

| chloroprene rubber | 100 part by weight |
| --- | --- |
| carbon black | 40 |
| softening agent | 5 |
| stearic acid | 2 |
| age resistor | 1.5 |
| magnesium oxide | 4 |
| calcium oxide | 5 |
| zinc oxide | 5 |
| processing aid | 3 |
| polyester staple (length: 2 mm) | variable |

In Embodiments 1 and 2 of the present invention, the compounds, which are obtained by mixing the thermoplastic material with the staples by 15 and 40 volume %, are extruded and molded by a mold in which a space portion 3 has a length l of 15 mm. In Comparative Example, the same materials as in Embodiment 1 are extruded and molded by a mold in which the space portion 53 has a length l of 2.5 mm.

Figure 16:
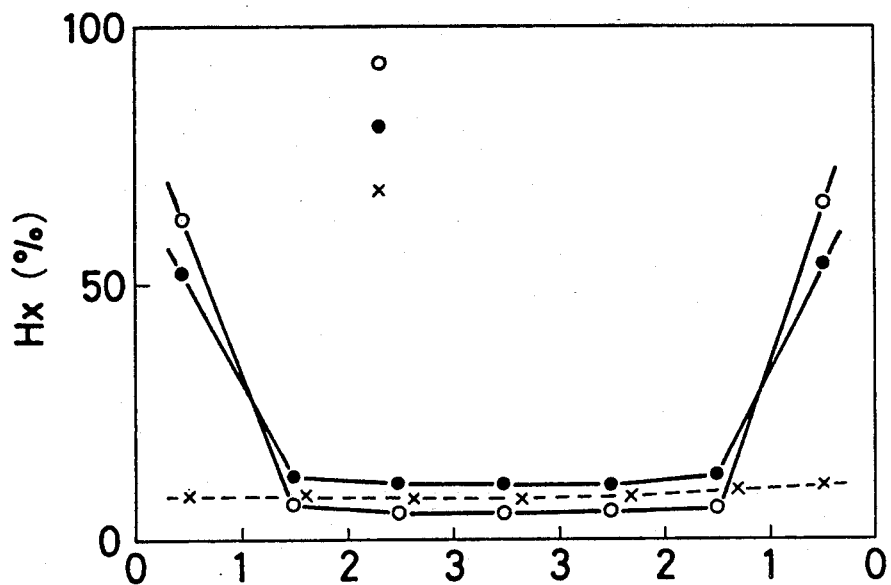
FIGS. 16 and 17 are diagrams showing the results of tests, respectively.
Figure 17:
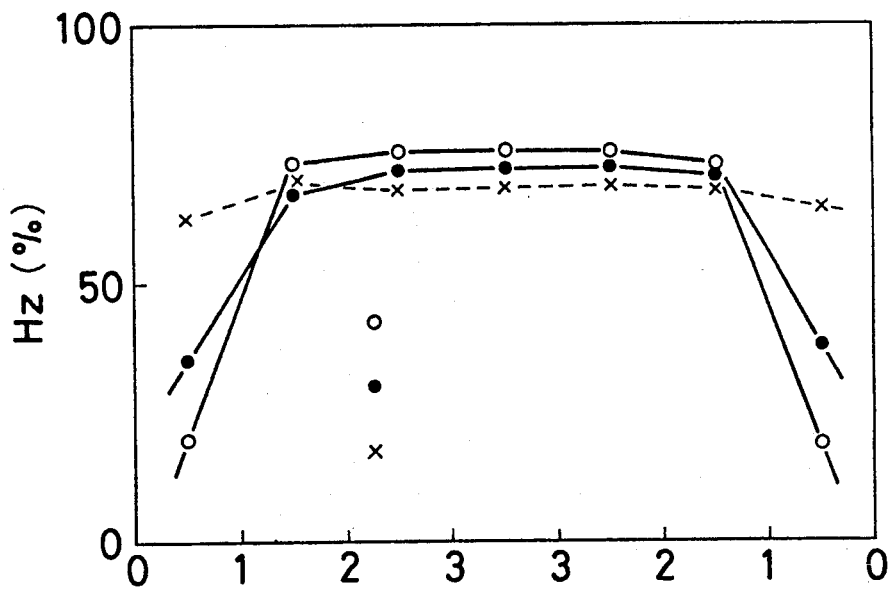

In Embodiments 1 and 2, there can be prepared a sheet having a thickness of about 7 mm. The vulcanized sheet is sliced into pieces having a thickness of about 1 mm. The pieces thus obtained are immersed in toluene for 48 hours at a room temperature so as to measure linear expansion coefficients. FIGS. 16 and 17 show the staple orientation coefficients based on the results of measurement.

Figure 18:
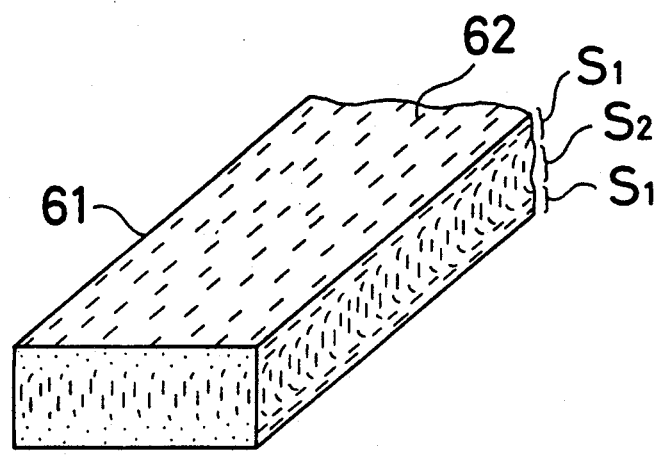
FIG. 18 is a perspective view of the staple complex sheet.
Figure 19:
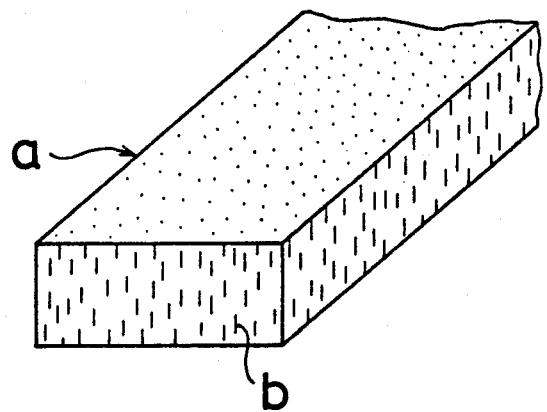
FIG. 19 is a perspective view of the staple complex sheet according to a comparative example.

Referring to Embodiments 1 and 2, the staples are mainly oriented in the sheet length direction on the sheet surface layer represented by S, in FIG. 18, while in the perpendicular direction to the sheet surface on the inner center layer represented by S, in FIG. 18. Furthermore, it is found that the orientation is lowered in the length direction on the sheet surface layer as an amount of the staples is increased. Referring to Comparative Example, the orientation is almost uniform over the whole sheet as shown in FIG. 19. In Embodiments 1 and 2, the staples 62 of the sheet 61 have the orientation coefficient which is high in the extrusion direction on the surface layer (Hx>50%), is high in the vertical direction of the sheet on the inner center layer (Hz>50%) and is mean on a middle layer between the surface layer and the inner center layer. In Comparative Example, staples b of a sheet a are oriented as shown in FIG. 19. There are defined by the following formulas the orientation coefficient Hx in the sheet length direction and the orientation coefficient Hz in the perpendicular direction to the sheet surface (in the sheet thickness direction).

$$Hx = \{(1/Vx)/(1/Vx + 1/Vy + 1/Vz)\} \times 100(\%)$$

$$Hz = \{(1/Vz)/(1/Vx + 1/Vy + 1/Vz)\} \times 100(\%)$$

Vx: linear expansion coefficient in the sheet length direction in a solvent
Vy: linear expansion coefficient in the sheet width direction in the solvent
Vz: linear expansion coefficient in the perpendicular direction to the sheet surface (in the sheet thickness direction) in the solvent In the case where the staple complex sheet thus formed is to be used for a cushioning material by itself or in piles, the staples are oriented with an orientation coefficient of Hx>50% in the sheet length direction on the sheet surface layer. Consequently, a deformation resistance is increased in the sheet length direction, so that the peculiar mechanical behavior can be presented. In addition, the staple complex sheet has the mean orientation coefficient on the middle layer between the surface layer and the inner center layer, so that the staple orientation is changed successively and naturally. Consequently, a stress concentration portion is not generated. Thus, a life can be made longer for both static and dynamic uses.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. In a method for manufacturing a fiber reinforced elastic sheet formed of a staple complex elastomer,
the staple complex elastomer including a thermoplastic material and staples which have an aspect ratio of 10 or more and a length of 10 mm or less, and a factor b is 0.6 to 1.0 when a viscosity is $2.0 \times 10^4$ to $1.0 \times 10^7$ poise, a temperature is 70° to 140° C. and a shearing strain speed $d\gamma/dt$ is 1 to 200 sec$^{-1}$ in the following formula, $$\log \eta = a/T - b \log(d\gamma/dt) + c$$

$\eta$: viscosity (poise)
a, b, c: constant
T: absolute temperature (°K)
$d\gamma/dt$: shearing strain speed (sec$^{-1}$)
a mold having the following dimensions, $$ho/hm \geq 3$$

$$hm \leq 2 \text{ mm}$$

$$lmo \geq 3 \text{ hm}$$

ho: dimension of the outlet of the mold in the vertical direction of the sheet
hm: dimension corresponding to ho in a minimum dimension portion in a molding passage of the mold
lmo: length of the molding passage from the outlet to the minimum dimension portion of the mold
and orientation coefficients of the staples are as follows, $$Hz > Hx \text{ and } Hz > Hy$$

$$Hx = \{(1/Vx)/(1/Vx + 1/Vy + 1/Vz)\} \times 100 \text{ (\%)}$$

$$Hy = \{(1/Vy)/(1/Vx + 1/Vy + 1/Vz)\} \times 100 \text{ (\%)}$$

$$Hz = \{(1/Vz)/(1/Vx + 1/Vy + 1/Vz)\} \times 100 \text{ (\%)}$$

Hx: staple orientation coefficient in a sheet length direction
Hy: staple orientation coefficient in a sheet width direction
Hz: staple orientation coefficient in the perpendicular direction to a sheet surface (in a sheet thickness direction)
Vx: linear expansion coefficient in the sheet length direction in a solvent Vy: linear expansion coefficient in the sheet width direction in the solvent Vz: linear expansion coefficient in the perpendicular direction to the sheet surface (in the sheet thickness) in the solvent.

2. A method for manufacturing a fiber reinforced elastic sheet according to claim 1, wherein the mold is a T-die having a molding passage which is gradually enlarged in the sheet width direction.

3. A method for manufacturing a fiber reinforced elastic sheet according to claim 1, wherein the mold is a ring die having a ring molding passage.

4. A method for manufacturing a fiber reinforced elastic sheet according to claim 1, wherein the mold includes an outlet having at least one arcuate outlet portion.

5. A method for manufacturing a fiber reinforced elastic elastomer comprising circumferentially extending and extruding a staple complex elastomer mixed with staples through a ring groove of an expansion die so as to circumferentially orient the staples, the expansion die having an inner peripheral surface, an outer peripheral surface and the ring groove which is provided between the inner and outer peripheral surfaces and is substantially filled with the staple complex elastomer, wherein the cylindrical staple complex elastomer extruded from the ring groove of the expansion die is unpressurized and is gradually extended circumferentially.

* * * * *